United States Patent [19]

Salomon et al.

[11] Patent Number: 5,198,714

[45] Date of Patent: Mar. 30, 1993

[54] MULTIPLE-SURFACE SENSOR CONTROL FOR A TRAVELING WAVE MOTOR

[75] Inventors: Bernd Salomon, Frankfurt am Main; Reinhard Orthmann, Mainz-Gonsenheim, both of Fed. Rep. of Germany

[73] Assignee: Licentia Patent-Verwaltungs-GmbH, Frankfurt am Main, Fed. Rep. of Germany

[21] Appl. No.: 720,827

[22] PCT Filed: Nov. 19, 1990

[86] PCT No.: PCT/EP90/01973

§ 371 Date: Jul. 15, 1991

§ 102(e) Date: Jul. 15, 1991

[87] PCT Pub. No.: WO91/08594

PCT Pub. Date: Jun. 13, 1991

[30] Foreign Application Priority Data

Nov. 29, 1989 [DE] Fed. Rep. of Germany ....... 3939419

[51] Int. Cl.⁵ .............................................. H01L 41/08
[52] U.S. Cl. .................................................. 310/323
[58] Field of Search ................ 310/323, 328, 316, 317

[56] References Cited

U.S. PATENT DOCUMENTS

| | | | |
|---|---|---|---|
| 4,692,649 | 9/1987 | Izukawa et al. | 310/316 |
| 4,794,294 | 12/1988 | Shimuzu et al. | 310/316 |
| 4,833,358 | 5/1989 | Suzuki et al. | 310/323 |
| 5,001,404 | 3/1991 | Kataoka | 310/316 X |

FOREIGN PATENT DOCUMENTS

| | | |
|---|---|---|
| 0298681 | 1/1989 | European Pat. Off. . |
| 3719537 | 12/1987 | Fed. Rep. of Germany . |
| 0012881 | 1/1989 | Japan ................................ 310/323 |
| 0238476 | 9/1989 | Japan ................................ 310/323 |
| 0264580 | 10/1989 | Japan ................................ 310/316 |
| 0041674 | 2/1990 | Japan ................................ 310/323 |
| 0307375 | 12/1990 | Japan ................................ 310/323 |

OTHER PUBLICATIONS

Technische Rundschau, vol. 81, No. 46, Nov. 17, 1989, Beru, CH Seiten 102-105; G. Schadebiodt et al: "Der Piezo—. . ." Seike 104.

Patent Abstracts of Japan, vol. 13, No. 192 (E-753) (3540) May 9, 1989; JP-A-1 12881 (Canon Inc.) Jan. 17, 1989.

Primary Examiner—Mark O. Budd
Attorney, Agent, or Firm—Spencer, Frank & Schneider

[57] ABSTRACT

In an apparatus for evaluating and controlling the driving state of a traveling wave motor composed of a stator equipped with an elastic vibrating body and an excitation system composed of a plurality of segments and generating ultrasound vibrations as well as a rotor that is in contact under pressure with the stator in a surface region and is equipped with a sensor device that is disposed at the vibrating body or at the excitation system, the signals of the sensor device are fed to the regulating circuit of an evaluation and control unit for controlling the excitation system. The sensor device includes at least two sensor surfaces which are attached to the vibrating body or to the excitation system and the signals corresponding to the sensor surfaces are fed separately to the evaluation and control unit.

11 Claims, 6 Drawing Sheets

MULTIPLE-SURFACE SENSOR CONTROL FOR A TRAVELING WAVE MOTOR

BACKGROUND OF THE INVENTION

The present invention relates to a method and an apparatus for controlling a traveling wave motor as disclosed in DE 3,306,755.A1. The vibrating stator of such a motor includes ultrasound excitation systems which are equipped with electrodes and are connected in a friction lock with the actual vibrating body. At a surface region of the vibrating body, the vibrating stator is axially pressed into contact with a rotor. Rotational rotor movements are generated by mechanical waves that are excited in the excitation system, with the individual vibrating surface elements of the vibrating body moving on an approximately elliptical path so that, due to the friction lock between the stator and the rotor surface, tangential forces are generated in the contact zone between the two surfaces and lead to the formation of a rotary movement and a torque on the rotor.

The operating state of such a traveling wave motor is dependent on a plurality of parameters, particularly the temperature, the axial pressure between stator and rotor and the frequency, amplitude and shape of the excited traveling waves. The setting of the desired operating parameters, adaptation of the motor feeding frequency if there is a change in the natural mechanical frequency due to temperature and long-term influences, and the required limitation of the amplitude of the traveling waves in order to protect the excitation system and the contact zone between the rotor and the vibrating stator, require such motors to be guided by one or several control circuits. For this purpose, information about the actual state of the stator-rotor system, particularly the frequency, amplitude and shape of the traveling wave, must be supplied to the control system.

DE 3,634,329 already discloses an actuating circuit for an ultrasonic wave motor in which it is ensured that the motor is always actuated at its resonant frequency. For this purpose, a monitoring electrode is provided to detect the phase difference between the signal of the monitoring electrode and a periodic actuation voltage applied to drive the motor.

A drawback of this and is that only indirect information about the presence and characteristics of the traveling waves is evaluated since only one sensor surface is available and therefore only the amplitude of one surface region can be sensed. Amplitude values and phase relationships of the deflections of different surface regions of the vibrating body are not detected by the prior art actuation circuit. In particular, a standing wave, which does not directly produce any effects on the motor, cannot be distinguished from a traveling wave since both create the same signal image on a single-surface sensor.

SUMMARY OF THE INVENTION

It is an object of the present invention to avoid the listed drawbacks of the prior art system for evaluating and controlling the driving state of a traveling wave motor and to provide an apparatus in which the actual value signals from a sensor device unequivocally characterize the vibration state of the vibrator.

This is accomplished according to the invention by providing an apparatus for evaluating and controlling the driving state of a traveling wave motor composed of a stator, having an elastic vibrating body and an excitation system including a plurality of segments and generating ultrasound vibrations, as well as a rotor which in a surface region is pressed into contact with the stator and is provided with a sensor device disposed at the vibrating body or at the excitation system, with the signals of the sensor device being fed to the regulating circuit of an evaluation and control unit for controlling the excitation system, the excitation system being composed of two circular ring shaped partial systems which are shifted in space relative to one another by an amount of $(n+\frac{1}{4})\cdot\lambda$, where n indicates a positive integer and $\lambda$ the wavelength of a traveling wave to be excited, the apparatus being characterized in that: first to third sensor surfaces are provided which are arranged on a circular ring segment which is arranged concentrically to the two partial systems of the excitation system and are shifted in space by either $\lambda/3$ or $\lambda/6$ in relation to one another.

The invention is based on the realization that unequivocal actual value signals with respect to the vibration states actually existing in the vibrator are furnished by three-surface and and are fed to an evaluation and control unit in a control circuit. From the partial signals of the three-surface sensors, signal vectors representing an image of the traveling wave excited in the resonant circuit can be formed by geometric addition. From the partial amplitudes of the three-surface sensors, a conclusion can be drawn as to the amplitude distribution of the traveling wave. From the phase shifts between the partial signals of the multi-surface sensors, a conclusion can be drawn as to the phase relationships of the respectively excited vibration state and a reliable distinction can be made between a traveling wave and a standing wave while the propagation direction of the wave and the direction of rotation of the motor can be determined unequivocally.

Moreover, the three-surface sensor control according to the invention makes it possible, by way of an evaluation of the phase difference between the sensor voltages, to influence the phase positions of the motor feeding voltages relative to one another in such a way that the desired phase relationship results between the individual sensor voltages and thus the desired shape of the traveling wave. For this purpose, information about the phase difference between the two sensor voltages is fed to a prior art phase control circuit which determines the phase position between the two motor feeding parameters in the desired manner.

This also makes it possible to compensate, by way of regulation, manufacturing caused tolerances in the polarization structure and polarization level of piezoceramic excitation systems so that demands for manufacturing tolerances can be reduced.

A three-surface sensor may also be employed to advantage to detect slip between the vibrating stator and the rotor since due to the slip almost all natural frequencies of the vibrator are excited and a mixture of many frequencies results which is reflected at the sensor and can easily be detected by the evaluation circuit by means of simple filtering measures.

DESCRIPTION OF THE PREFERRED EMBODIMENTS

Figure 1:
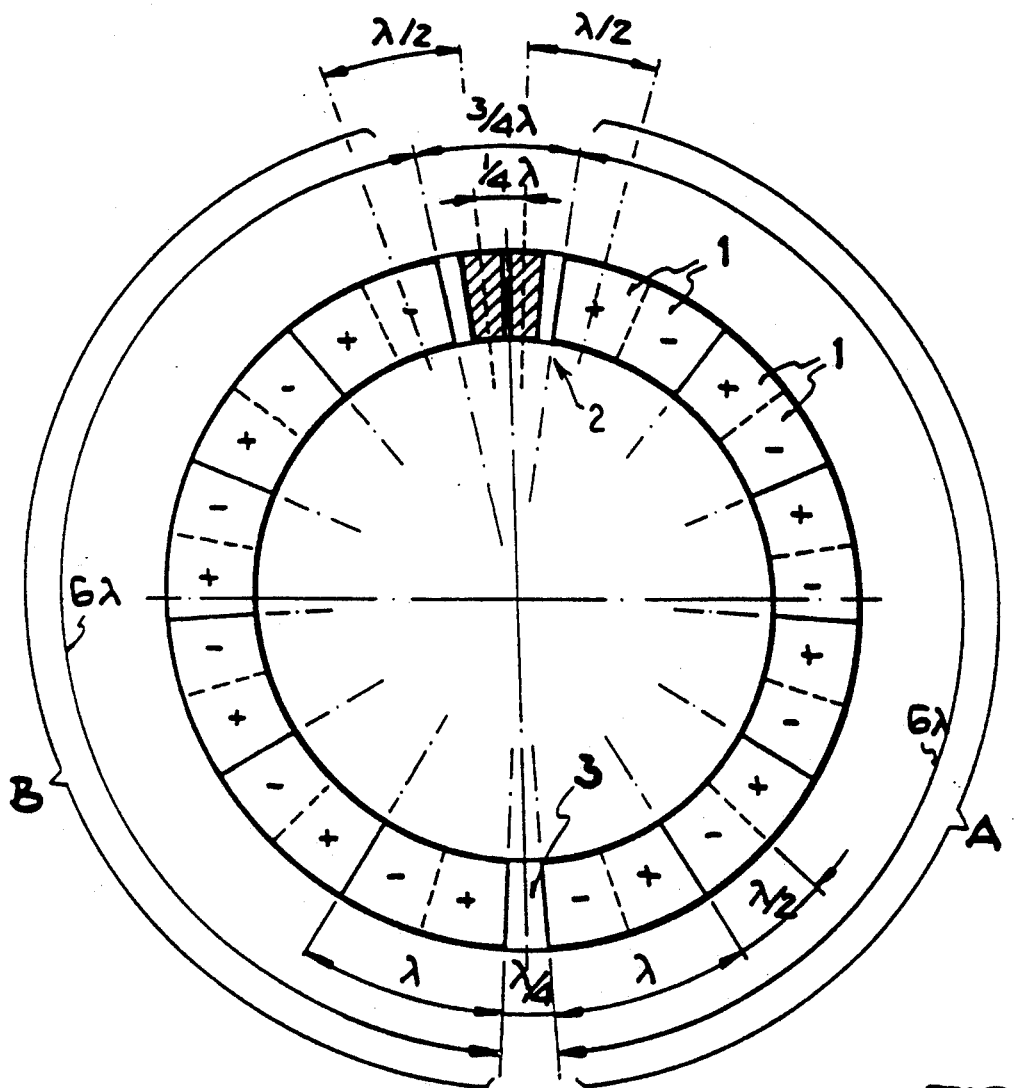
FIG. 1 shows the structure of the divisions of a ring vibrator for generating controllable mechanical traveling waves.

FIG. 1 illustrates the division structure of a vibrating stator composed of two circular ring segment-shaped excitation systems A and B. Each one of the excitation systems, which are configured, for example, as piezoceramic elements, includes alternating positively and negatively polarized segments 1 whose circumferential length in each case is determined by the wavelength $\lambda$ of the traveling wave to be excited. The total circumference of the circular ring segments for the vibrator shown in FIG. 1 has a length of 13$\lambda$, 6$\lambda$ for each region A and B. As a whole, a region of one wavelength $\lambda$ is free of the piezoceramic material. Partial systems A and B are shifted in space by $\lambda/4$ relative to one another in a known manner.

Figure 2:
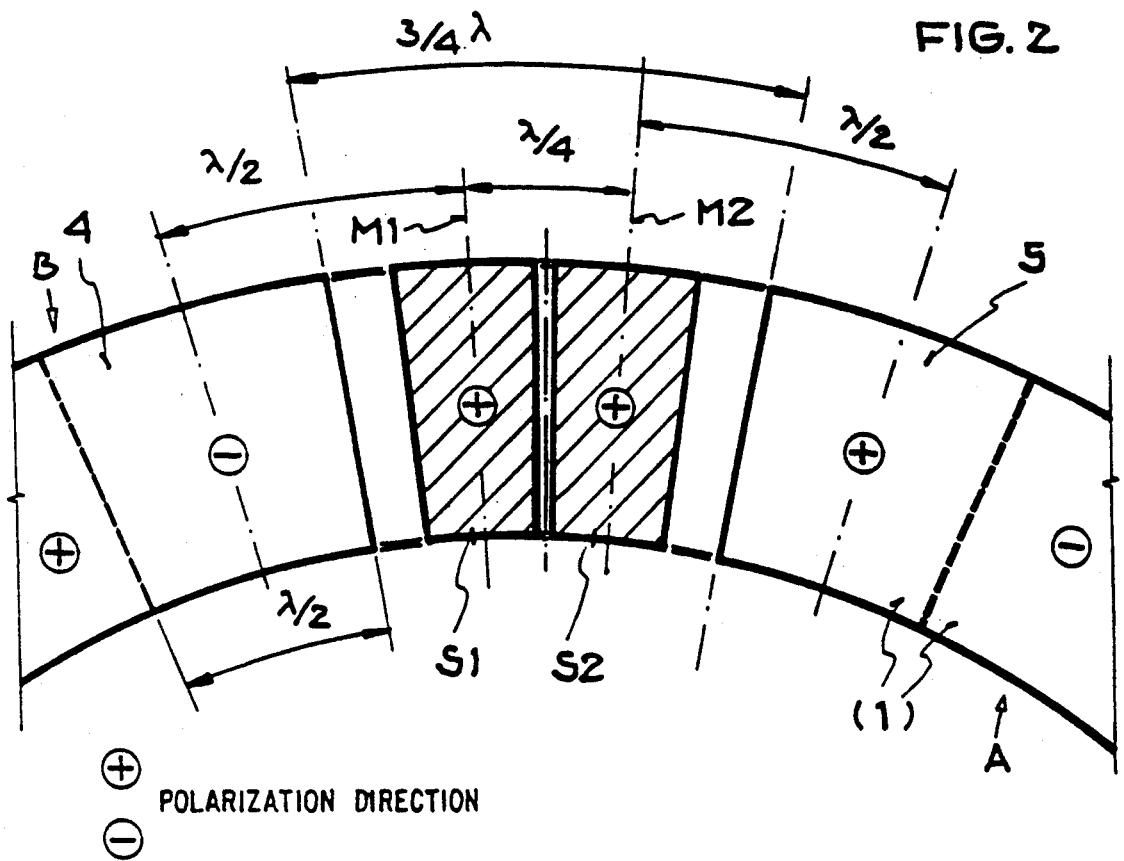
FIG. 2 shows the arranging principle of a two-surface sensor.

In FIG. 2, a two-surface sensor 2 is arranged in a circular ring sector having a circumferential length of $(\frac{3}{4})\lambda$ opposite a sector having a circumferential length of $(\frac{1}{4})\lambda$ so that a spatial shift of $\frac{1}{4}\lambda$ results between the two partial sensors S1 and S2. The sensor signal images those deformation states which exist in the ceramic material at this location and are caused by the deformations of the ultrasonic excitation systems. An advantage in this connection are sensors which are integrated in the excitation system and which are also configured of ceramic elements provided with electrodes like the segments of excitation systems A and B. Only their size and relative position to one another and to the excitation systems is different so that, compared to discrete sensor arrangements, this results in a particular simplicity of manufacture and of arrangement on the vibrating stator. By appropriate selection of the polarization direction of the ceramic material, the sign of the measuring signal can be fixed. On the other hand, the invention can also be realized with discrete sensors which are disposed at the excitation system or at the vibrating body.

If one actuates partial systems A and B with steady excitation functions whose periods are shifted in phase by $\pi/2$, that is by 90°, relative to one another, superposition of the partial waves excites in a known manner a traveling wave along the periphery of the correspondingly dimensioned vibrator. The possible oscillation shapes and natural frequencies of the traveling waves are characterized by the number of associated nodal circles and nodal lines; in the example of FIG. 1, the traveling wave has N=13 nodal lines.

If partial systems A and B are excited with the same amplitude and a phase shift of $\pi/2$, a traveling wave Y results along the periphery according to Y=C·cos ($\Omega$t−Nx), where C represents the amplitude, $\Omega$ the operating circuit frequency of the vibrator, t the time variable, N the number of wavelengths along the periphery and x the locus on the vibrator circumference.

FIG. 2 is a sectional view of a circular ring shaped vibrator having two sensor surfaces S1 and S2 which are disposed symmetrically in a $\frac{3}{4}\lambda$ sector between segments 4 and 5 of the excitation system and at a distance of $\lambda/4$ between their center lines M1 and M2. Partial sensors S1, S2 also have a fixed association with segments 4 and 5 of excitation systems B and A, in such a way that the center axis of sensor surface S1 has a fixed distance of $\frac{1}{4}\lambda$ from the center axis of segment 4 and thus from the entire excitation system B. Likewise, the center axis of sensor surface S2 has a fixed distance of $\frac{1}{4}\lambda$ from the center axis of segment 5 and thus from excitation system A. Thus the sensor signals not only have a fixed phase relationship to one another (here $\lambda/4$=90°), they also have a defined distance relationship to excitation systems A and B for the desired traveling wave. The phase relationship of the signals resulting from the distance relationship is also a function of the respective polarization direction of the ceramic surfaces. If there is a change in sign in the polarization direction, the sign of the signal derived from this ceramic surface also changes.

In another advantageous embodiment of the two-surface sensor, the distance between the sensor center lines M1 and M2 is $(n\cdot\lambda/2+\lambda/4)$, where n=0, 1, 2, ..., $\infty$.

Figure 3:
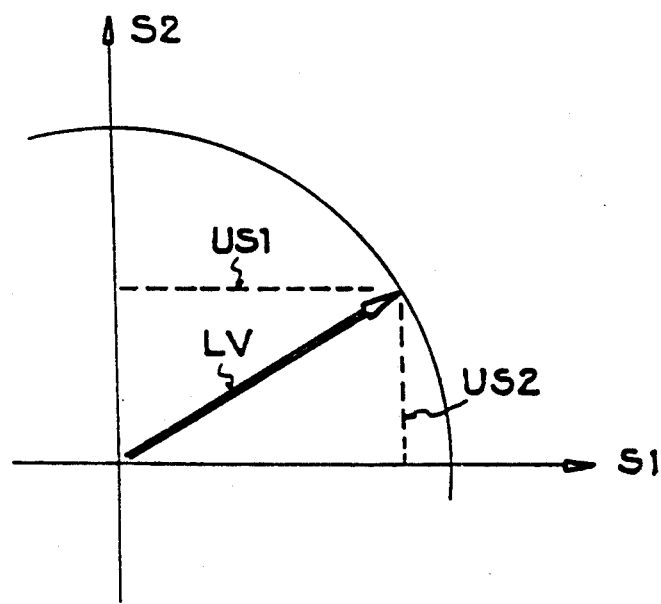
FIG. 3 shows the formation of a position vector LV from the signals of a two-surface sensor.

FIG. 3 shows the formation of a position vector LV from measurement signals US1 and US2 of sensors S1 and S2, respectively, of a two-surface sensor as shown in FIG. 2. An example of sensing by means of a two-surface sensor will now be described in greater detail. The amplitude values of measurement signals US1 and US2 represent the deflections of the ceramic sensors S1 and S2 and permit a determination of the amplitude distribution of the traveling wave, while the phase shifts between partial signals US1 and US2 permit the shape of the oscillation to be determined, particularly a distinction to be made between a traveling wave and a standing wave, as well as a determination of the propagation direction and direction of rotation of the motor for the excited vibration.

An ideal traveling wave of the shape Y=C·cos ($\Omega$t−Nx) is formed with a two-surface sensor according to FIG. 2 by identical-amplitude partial signals US1 and US2 with a phase shift in time of 90° between the signals and a signal frequency which is equal to the operating frequency of the vibrator.

Figure 4:
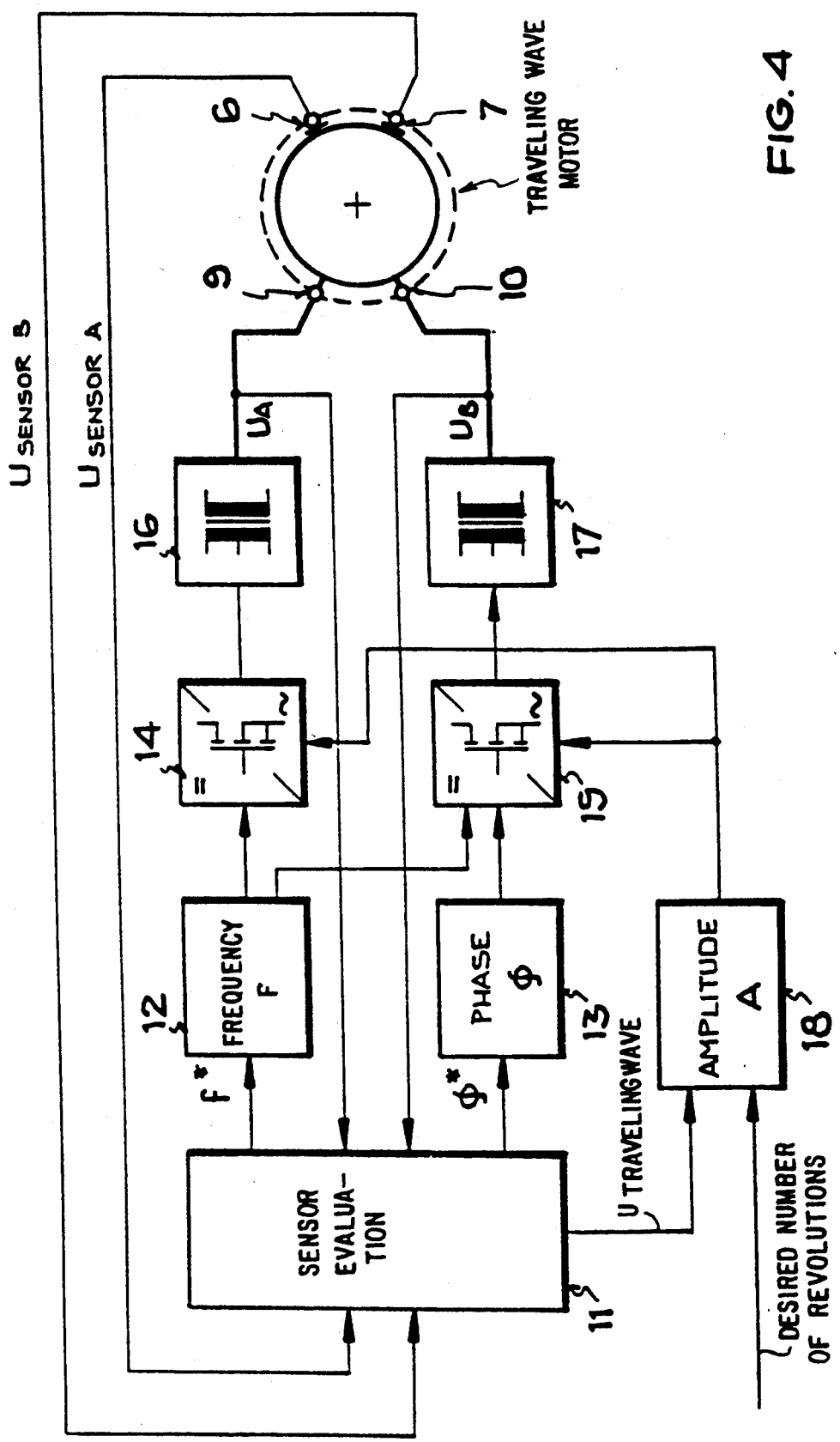
FIG. 4 shows an embodiment of the basic regulator structure for a traveling wave motor including a two-surface sensor.
Figure 5:
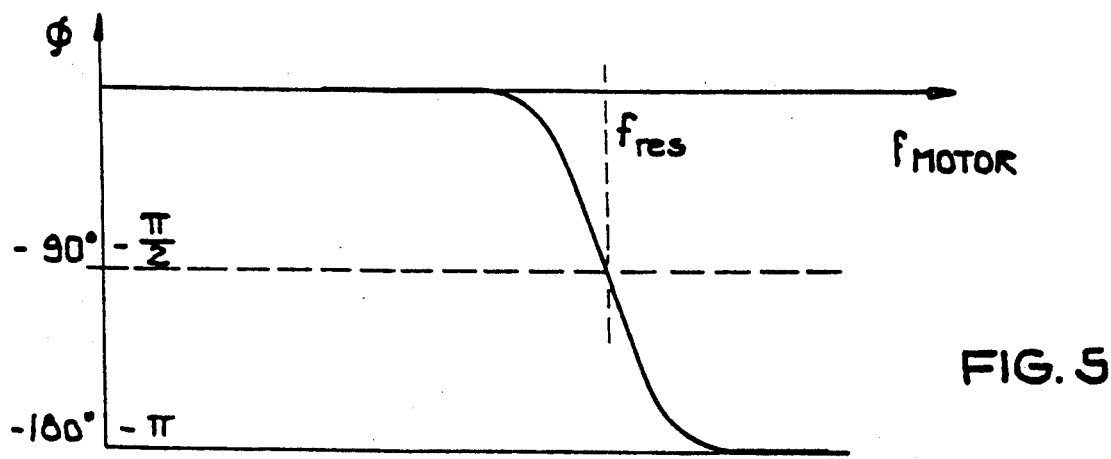
FIG. 5 shows the phase relationship between the excitation frequency of a partial system A or B and a corresponding sensor.

A schematic representation of the structure of the controller for a traveling wave motor having two sensors is shown in FIG. 4. Here, the reference numerals 6 and 7 identify the two sensors, while 9 and 10 indicate the electrodes for actuating partial systems A and B with feeding voltages $U_A$ and $U_B$, respectively. The voltages $U_{SENSOR\,A}$ and $U_{SENSOR\,B}$ are fed to a sensor evaluation member of circuit 11 which determines a desired frequency F* and a desired phase $\phi$* between voltages OA and OB and transmits them to the frequency and phase determining circuits 12 and 13 whose signals are used in inverters 14, 15 and are conducted through matching members 16 and 17 to electrodes 9 and 10. As will be shown below, sensor evaluation circuit 11 is able to determine from signals $U_{SENSOR\,A}$ and $U_{SENSOR\ B}$ the amplitude of the traveling wave $U_{TravelingWave}$ which is a measure of the number of revolutions of the motor. A comparison between the desired number of revolutions and the number of revolutions determined by circuit 11 is made in circuit 18 and may be utilized to control the motor by wa of inverter 14. From the sensor signals, the control circuit obtains all information required for controlling the driving state of a traveling wave motor, particularly those which relate to the location of the motor operating point on the resonance characteristic, the amplitude of the traveling wave and the direction and rate of rotation of the traveling wave. Since in an arrangement of the sensor surfaces according to FIG. 2 decoupled detection of the vibration states of partial systems A, B is ensured, for example, the sensor voltaqe $U_{SENSOR\ A}$ of sensor A of FIG. 3 detects only the vibration states produced by partial system A. Thus, at every operating point of the motor on its resonance characteristic there exists a relationship between the phase angle of the exciting partial system (here partial system A) and the signal of the corresponding sensor surface (here $U_{SENSOR\ A}$) As can be seen in FIG. 5, if the motor is operated exactly at its resonant frequency, the phase difference is $-\pi/2 = -90°$ while at a lower or higher frequency of the excitation voltage, the phase difference is greater or less than $-90°$, respectively. By controlling this phase difference, the motor can be operated at any time at its optimum operating point, independently of temperature and load.

Since the amplitude of the traveling wave is directly proportional to the rate of rotation of the motor, it is desirable for a control of the number of motor revolutions to obtain information about the height of the traveling wave. Existing standing wave components should have no influence.

The known trigonometric addition theorem is employed to determine the traveling wave amplitude. The feeding voltages for partial systems A and B are assumed to be $$U_A = |U_{Motor}| * \sin(\Omega^* t)$$

$$U_B = |U_{Motor}| * \cos(\Omega^* t)$$

where $\Omega = 2 * \pi * f_{Motor}$ and $f_{Motor}$ is the excitation frequency of the motor.

The sensor voltages are assumed to be $$U_{SENSOR\ A} = |U_{TravelingWave}| * \sin(\Omega^* t + \phi)$$

$$U_{SENSOR\ B} = |U_{TravelingWave}| * \cos(\Omega^* t + \phi)$$

where $\phi$ is the phase angle between $U_A$ and $U_{SENSOR\ A}$ and between $U_B$ and $U_{SENSOR\ B}$, respectively. If this phase $\phi$ equals 90°, that is, the motor is at its natural frequency, the amplitude $U_{TravelingWave}$ of the traveling wave is determined as follows:

$$|U_{TravelingWave}| = \frac{U_A * U_{SENSER\ A} + U_B * U_{SENSOR\ B}}{SQRT(U_A^2 + U_B^2)}$$

where $SQRT(x) = \sqrt{x}$.

Any possibly existing standing wave components are expressed in the amplitude signal as an alternating component that is superposed on a direct signal and can thus be separated from the traveling wave signal and detected by means of simple analog or digital filtering processes.

Moreover, the evaluation of the phase relationship between the two sensor signals allows a determination of the direction of rotation of the traveling waves. In an arrangement of the individual sensor surfaces according to FIG. 2, each partial voltage of FIG. 3 corresponds to an individual component of the rotating vector LV of the traveling wave in the multi-component illustration. Thus, the phase relationship between the individual components provides accurate information about the direction of rotation of the traveling wave. If it is assumed, for example, that partial system A is excited with the voltage $U^* \sin(\Omega^* t)$ and partial system B with the voltage $U^* \cos(\Omega^* t)$ and the traveling wave rotates mathematically in the positive direction, the voltage across sensor A has a phase lead of $+90°$ relative to the voltage across sensor B, and in the reversed case it trails in phase by $-90°$. The sign of the phase difference and thus the sign of the direction of rotation can be detected with simple and known methods and can be reported to a higher order electronic control and regulating system.

Figure 6:
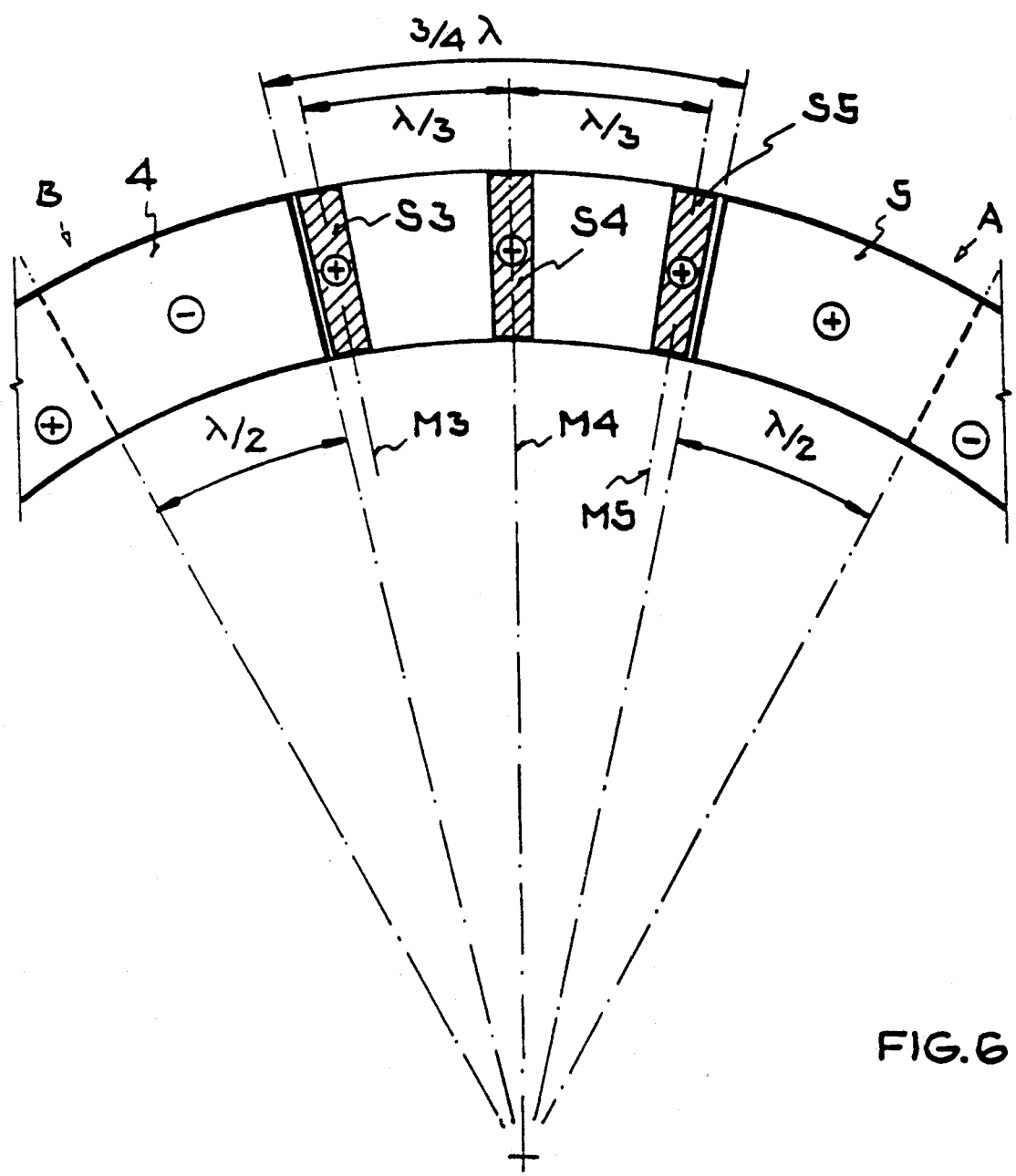
FIG. 6 shows the arranging principle for a three-surface sensor according to the invention.

FIG. 6 illustrates the configuration of a three-surface sensor according to the invention. It is composed of sensor surfaces S3, S4 and S5 which are arranged in a $\frac{2}{3}\lambda$ sector at a respective distance of $\lambda/3$ between center lines M3, M4 and M5.

Figure 7:
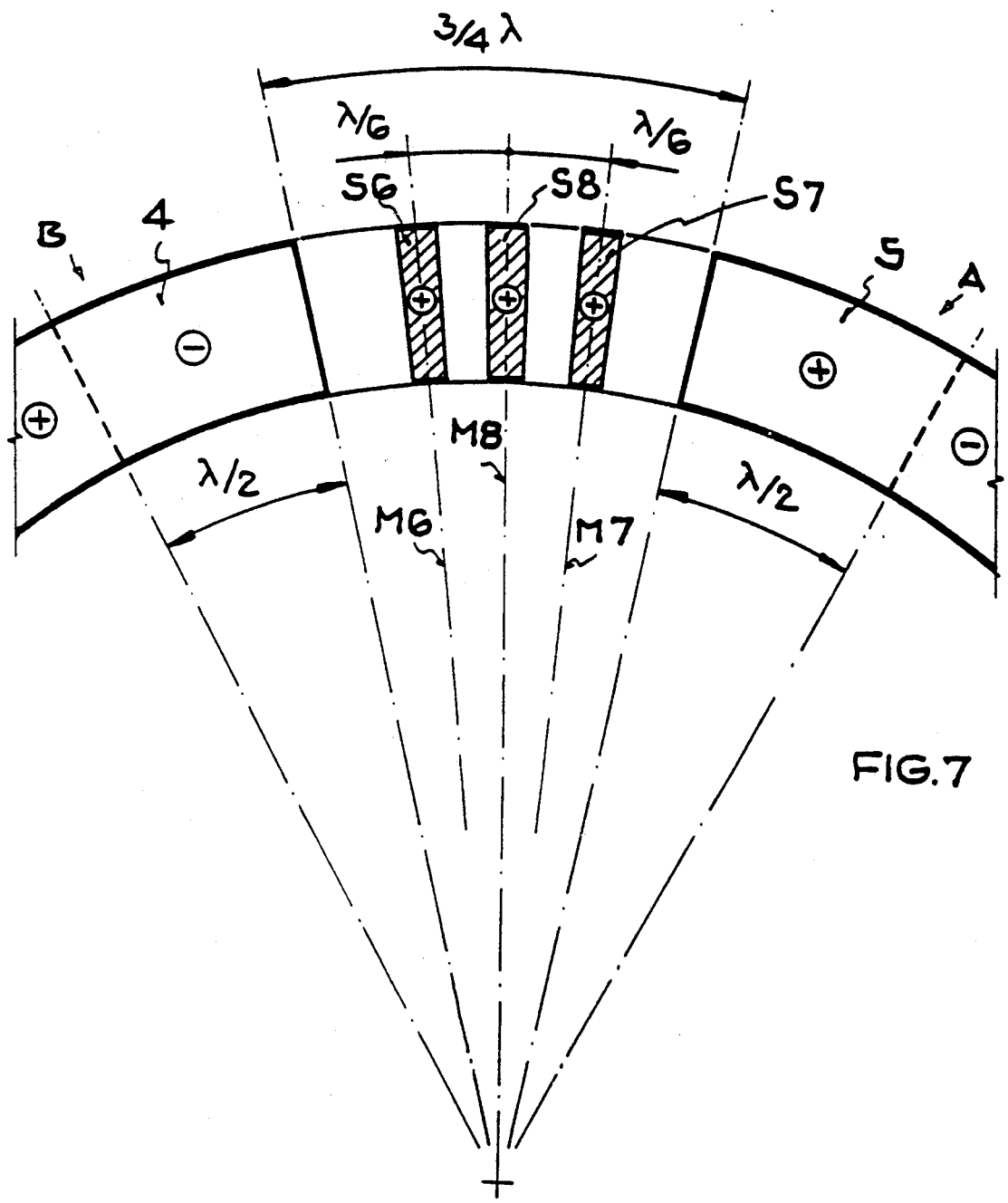
FIG. 7 shows the arranging principle of a further three-surface sensor.

FIG. 7 shows a further embodiment of a three-surface sensor in which, in order to reduce the amount of surface area required, the distance between center lines M6, M7 and M8 of sensor surfaces S6, S7 and S8 has been reduced to $\lambda/6$.

An arrangement of the sensor surfaces according to FIG. 7, similar to the arrangement according to FIG. 6, permits the representation of the measurement signals in a three-phase coordinate system in which the coordinate axes are shifted relative to one another by 120° with reference to the wavelength $\lambda$ of the traveling wave.

Figure 8:
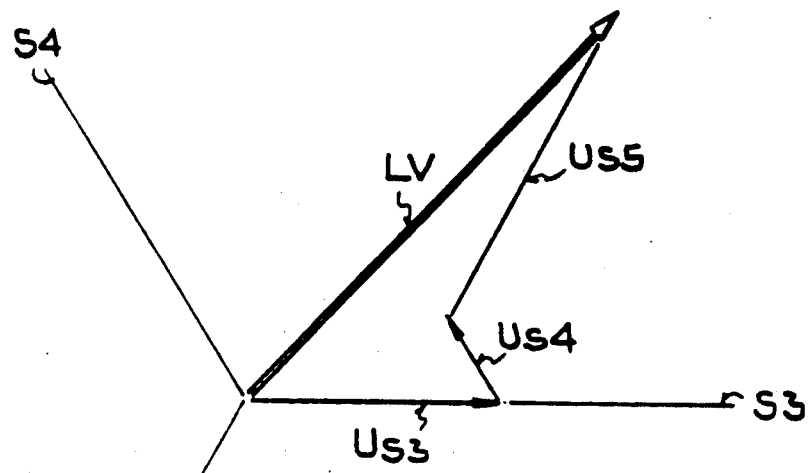
FIG. 8 shows the formation of the position vector LV from the signals of a three-surface sensor according to FIG. 6.

FIG. 8 shows the formation of a position vector LV from partial signals US3, US4 and US5 in an arrangement according to FIG. 6. The position of the sensor centerlines M3, M4, M5 relative to one another directly corresponds to the position of coordinate axes S3, S4, S5.

Figure 9:
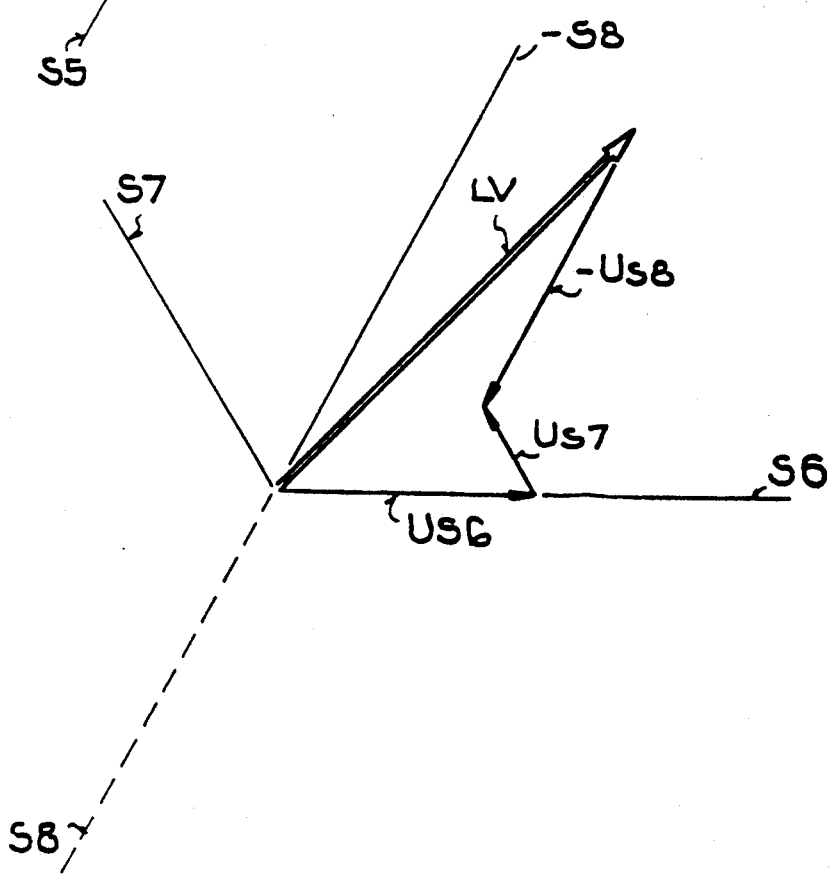
FIG. 9 shows the formation of a position vector LV for a three-surface sensor according to FIG. 7.

FIG. 9 shows the formation of position vector LV from sensor signals US6, US7 and US8 of an arrangement according to FIG. 7. Here the position of partial sensors S6, S7, S8, which are changed in space relative to FIG. 6, also results in a different association between sensor signals and coordinate axes. If sensor axis S6 is selected as the base coordinate and sensor axis S7 as the next coordinate in the counting or counterclockwise direction, sensor axis S8 must be set as the "folded-over" third coordinate. The geometric addition of these partial vectors which are given their correct signs here again results in an unequivocal determination of the position vector LV of the traveling wave.

The arrangement according to FIG. 6 permits a larger configuration of the individual sensor surfaces and thus a greater measuring signal amplitude, with the advantage of a greater signal to noise ratio.

In all three-phase arrangements it is advantageous that harmonics in the traveling wave which are of an order that is divisible by 3 are suppressed. It must again be emphasized here that a change in the polarization axes requires the signs of the measurement signals to be reversed to correspond to a phase shifted by 180°.

We claim:

1. An apparatus for evaluating and controlling the driving state of a traveling wave motor composed of a stator having an elastic vibrating body and an excitation system including a plurality of segments and generating ultrasound vibrations as well as a rotor which in a surface region is pressed into contact with the stator and is provided with a sensor device disposed at the vibrating body or at the excitation system, with the signals of the sensor device being fed to the regulating circuit of an evaluation and control unit for controlling the excitation system, the excitation system being composed of two circular ring-shaped partial systems (A, B) which are shifted in space relative to one another by an amount of $(n+\frac{1}{4})\cdot\lambda$, where n is a positive integer and $\lambda$ is the wavelength of a traveling wave to be excited, the apparatus being characterized in that:

the sensor drive includes first, second and third sensor surfaces (S3, S4, S5) which are disposed on a circular ring segment that is concentric with the two partial systems (A, B) of the excitation system and which are shifted in space relative to one another by $\lambda/3$.

2. An apparatus according to claim 1, characterized in that the sensor surfaces are integrated in the excitation system and are composed of piezoceramic material.

3. An apparatus according to claim 1, characterized in that a distance of $\frac{3}{4}\lambda$ is provided between the segments (4, 5) of the excitation system that lie closest to the sensor surfaces.

4. An apparatus for evaluating and controlling the driving state of a traveling wave motor composed of a stator having an elastic vibrating body and an excitation system including a plurality of segments and generating ultrasound vibrations as well as a rotor which in a surface region is pressed into contact with the stator and is provided with a sensor device disposed at the vibrating body or at the excitation system, with the signals of the sensor device being fed to the regulating circuit of an evaluation and control unit for controlling the excitation system, the excitation system being composed of two circular ring shaped partial systems (A, B) which are shifted in space relative to one another by an amount of $(n+\frac{1}{4})\cdot\lambda$, where n is a positive integer and $\lambda$ is the wavelength of a traveling wave to be excited, the apparatus being characterized in that:

the sensor device includes first, second, and third sensor surfaces (S6, S7, S8) which are disposed on a circular ring segment that is concentric with the two partial systems (A, B) of the excitation system and which are shifted in space relative to the other by $\lambda/6$.

5. An apparatus according to claim 4, characterized in that a distance of $\frac{3}{4}\lambda$ is provided between the segments (4, 5) of the excitation system closest to the sensor surfaces.

6. The apparatus according to claim 4, characterized in that the sensor surfaces are integrated in the excitation system and are composed of piezoceramic material.

7. A traveling wave motor, comprising:

a stator which includes
  a elastic vibrating body,
  excitation system means for exciting a traveling wave having a wavelength $\lambda$ in the vibrating body, the excitation system means including a first excitation system portion having a plurality of segments that are disposed adjacent one another along the circumference of a circle for less than 180° of the circle, and a second excitation system portion having a plurality of segments that are disposed adjacent one another along the circumference of the circle for less than 180° of the circle, the first excitation system portion having an end and the second excitation system portion having an end which is spaced apart from the end of the first excitation system by a gap, and
  first, second, and third sensors in the gap, the sensors being spaced apart from one another and being shifted by $\lambda/3m$ in relation to one another, where m is an integer; and
a rotor which is pressed against the stator.

8. The motor of claim 7, wherein m=1.

9. The motor of claim 7, wherein m=2.

10. The motor of claim 7, wherein the first, second, and third sensors are integrated with the excitation system means and are composed of piezoceramic material.

11. The motor of claim 10, wherein the gap has a width of $\frac{3}{4}\lambda$.

* * * * *